US 9,463,701 B2

(12) United States Patent
Hakeem et al.

(10) Patent No.: US 9,463,701 B2
(45) Date of Patent: Oct. 11, 2016

(54) ELECTRIFIED VEHICLE CHARGER

(71) Applicant: FORD GLOBAL TECHNOLOGIES, LLC, Dearborn, MI (US)

(72) Inventors: Mohannad Hakeem, Dearborn, MI (US); Eid Farha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 14/514,657

(22) Filed: Oct. 15, 2014

(65) Prior Publication Data

US 2016/0107529 A1    Apr. 21, 2016

(51) Int. Cl.
*H01R 11/00* (2006.01)
*B60L 11/18* (2006.01)

(52) U.S. Cl.
CPC ................... *B60L 11/1816* (2013.01)

(58) Field of Classification Search
CPC ............... Y02T 10/7072; Y02T 90/14; B60L 11/1818; B60L 2230/12; H01R 13/639; H01R 13/6395; H01R 13/6397; H01R 13/6392
USPC ......... 439/501, 504, 535, 310, 372, 34, 133, 439/144; 191/12.4, 12 R; 320/109, 111, 104
See application file for complete search history.

(56) References Cited

U.S. PATENT DOCUMENTS

| | | | | |
|---|---|---|---|---|
| 4,904,205 A * | 2/1990 | Rice | ......................... | H01R 13/72 191/12.4 |
| 5,720,627 A * | 2/1998 | Gillbrand | ............... | H02G 11/02 191/12 R |
| 5,831,245 A * | 11/1998 | Debourg | ............ | A45D 26/0014 219/227 |
| 5,855,262 A * | 1/1999 | Jackson | .............. | B60L 11/1816 191/12.4 |
| 8,550,833 B2 | 10/2013 | Martin | | |
| 2011/0139521 A1* | 6/2011 | Ichikawa | .............. | B60L 11/123 180/65.1 |
| 2011/0149455 A1* | 6/2011 | Ueno | ..................... | B60L 3/0069 361/87 |
| 2011/0234159 A1* | 9/2011 | Ohtomo | .............. | B60L 11/1816 320/109 |
| 2012/0228420 A1* | 9/2012 | Ichikawa | ............... | B60K 6/445 242/398 |
| 2013/0249282 A1* | 9/2013 | Ishii | ...................... | H02J 7/0055 307/10.1 |

OTHER PUBLICATIONS

Master Locks, Motorcycle Locks Webpage. Accessed at: www.masterlock.com/products/product_details/8156DPS.
GM Volt Owners Forum. Accessed at: http://gm-volt.com/forum/showthread.php?7958-Portable-110V-cord-anti-theft-device/page4&s=ccec0350e6b5faa67c2cbf08f24f3637.
AL-KO Secure Wheel lock website. Accessed at: http://secure.al-ko.co.uk/.

* cited by examiner

*Primary Examiner* — Abdullah Riyami
*Assistant Examiner* — Harshad Patel
(74) *Attorney, Agent, or Firm* — Carlson, Gaskey & Olds, P.C.

(57) ABSTRACT

An exemplary assembly includes a cord and a lockable charger housing, which has a surface that is shaped to correspond with a shape of a portion of an electrified vehicle. An exemplary method includes positioning a surface of a lockable charger housing against a portion of an electrified vehicle. The surface has a shape corresponding to a shape of a portion of the electrified vehicle. The method includes securing the lockable charger housing relative to the portion after the positioning.

16 Claims, 6 Drawing Sheets

ELECTRIFIED VEHICLE CHARGER

TECHNICAL FIELD

This disclosure is directed toward securing a charger of an electrified vehicle.

BACKGROUND

Generally, electrified vehicles differ from conventional motor vehicles because electrified vehicles are selectively driven using one or more battery-powered electric machines. Conventional motor vehicles, by contrast, rely exclusively on an internal combustion engine to drive the vehicle. Electrified vehicles may use electric machines instead of, or in addition to, the internal combustion engine.

Example electrified vehicles include hybrid electrified vehicles (HEVs), plug-in hybrid electric vehicles (PHEVs), fuel cell vehicles, and battery electric vehicles (BEVs). A powertrain of an electrified vehicle is typically equipped with a battery pack having battery cells that store electric power for powering the electric machines. The battery cells may be charged prior to use. The battery cells may be recharged during a drive via regenerative braking or the internal combustion engine.

In some electrified vehicles, such as PHEVs, a charger is used to communicate power from a wall source to the battery cells of the electrified vehicle when the vehicle is parked.

SUMMARY

An assembly according to an exemplary aspect of the present disclosure includes, among other things, a cord, and a lockable charger housing having a surface shaped to correspond with a shape of a portion of an electrified vehicle.

In another example of the foregoing assembly, the portion of the electrified vehicle is a vehicle wheel.

In another example of any of the foregoing assemblies, the lockable charger housing includes a groove to receive the cord when the cord is wrapped about the lockable charger housing.

In another example of any of the foregoing assemblies, the lock assembly is positioned along an axis. The cord wrapped about the axis when the cord is wrapped about the lockable charger housing and received within the groove.

In another example of any of the foregoing assemblies, the lockable charger housing includes a groove to selectively receive the cord.

In another example of any of the foregoing assemblies, the lockable charger housing includes an extension and the groove extends circumferentially about a perimeter of the extension.

In another example of any of the foregoing assemblies, the groove is continuous about the entire perimeter of the extension.

In another example of any of the foregoing assemblies, the assembly further comprises a lock assembly directly secured to the lockable charger housing. The lock assembly is moveable between a locked position and an unlocked position.

In another example of any of the foregoing assemblies, an electrified vehicle comprises the assembly. The electric vehicle includes a vehicle wheel. The lockable charger housing includes a groove that is received within a portion of the vehicle wheel when the lock is in the locked position. The groove receiving a portion of the cord when the lock is in the unlocked position.

In another example of any of the foregoing assemblies, a lock assembly is directly secured to the lockable charger housing. The locking assembly directly engages a portion of the wheel.

In another example of any of the foregoing assemblies, the locking assembly comprises a locking cylinder receivable within a locking receptacle of the wheel.

A method according to an exemplary aspect of the present disclosure includes, among other things, positioning a surface of a lockable charger housing against a portion of an electrified vehicle. The surface has a shape corresponding to a shape of the portion of the electrified vehicle. The method includes securing the lockable charger housing relative to the portion after the positioning.

In another example of any of the foregoing methods, the securing comprises actuating a lock.

In another example of any of the foregoing methods, the lock interfaces directly with the lockable charger housing.

In another example of any of the foregoing methods, the method includes providing a groove in the lockable charger housing. The groove is received within a portion of the vehicle wheel when the lock is in the locked position and the groove receives a portion of the cord when the lock is in the unlocked position.

In another example of any of the foregoing methods, the groove extends about a perimeter of the lockable charger housing.

In another example of any of the foregoing methods, the method includes inserting a lock cylinder within a lock receptacle during the securing.

In another example of any of the foregoing methods, the portion is at least partially provided by a rim of the wheel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
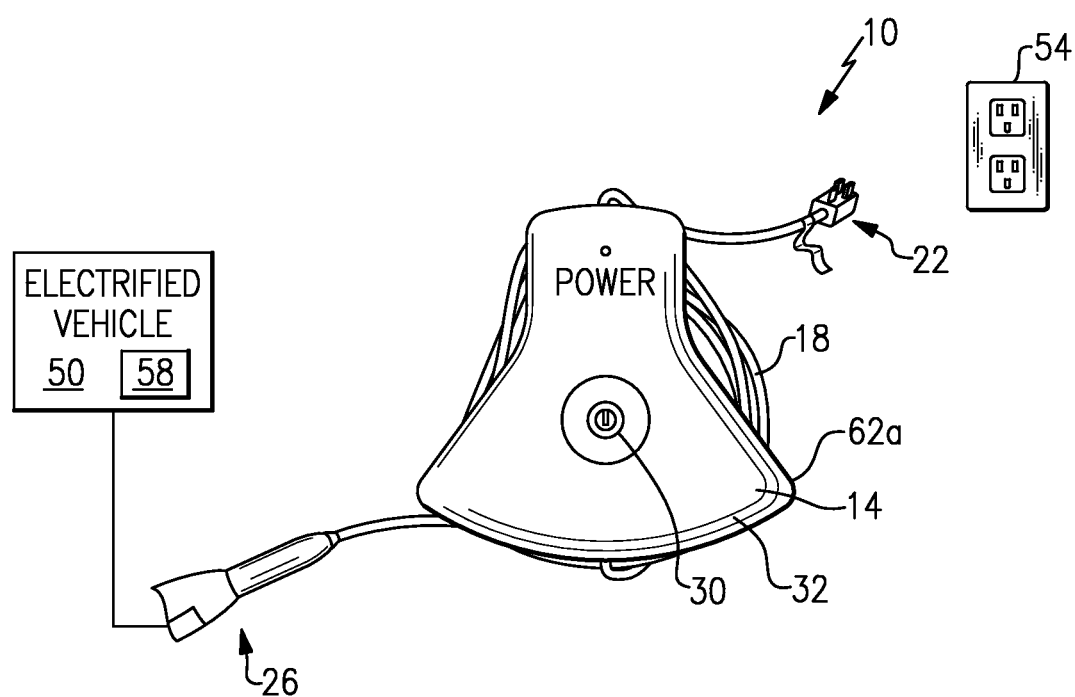
FIG. 1 shows an example lockable charger assembly.
Figure 2:
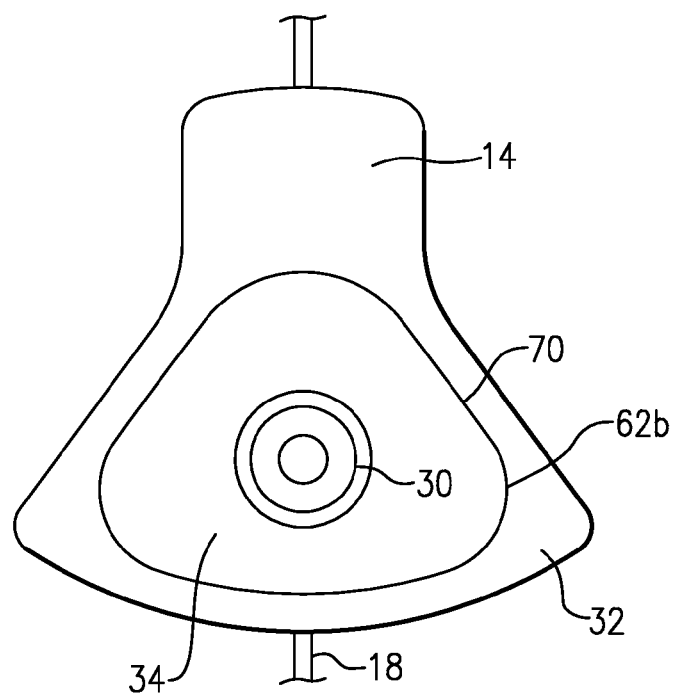
FIG. 2 shows a back of portions of the lockable charger assembly of FIG. 1 with the cord fully unwrapped.
Figure 3:
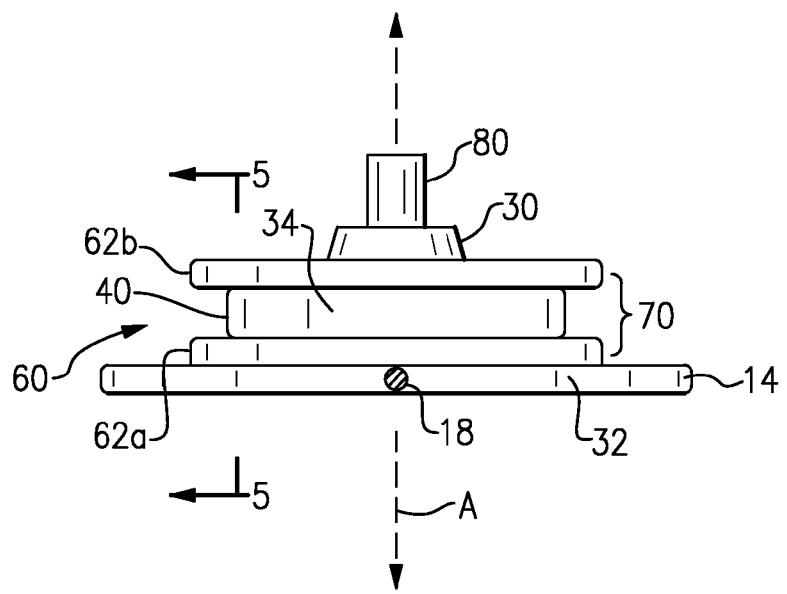
FIG. 3 shows a side view of portions of the lockable charger assembly of FIG. 1 with the cord fully unwrapped.

Many electrified vehicles, such as plug-in hybrid electric vehicles, use a charger. Power communicates to the electrified vehicle through the charger from a source external to the electrified vehicle, such as a wall source. The power charges battery cells of the electrified vehicle.

This disclosure is directed toward a charger that can be secured, and locked, to the electrified vehicle. Chargers can be expensive, and securing the charger can discourage theft.

Referring to FIGS. 1 to 5, an example lockable charger assembly 10 includes a lockable charger housing 14 and a cord 18. A first electrical connector 22 or plug is at one end of the cord 18. A second electrical connector 26 or plug is at an opposing end of the cord 18. A lock assembly 30 is positioned within the housing 14.

The housing 14 includes a cover 32 and an extension 34 extending from a back of the cover 32. The lock assembly 30 extends through the cover 32 and the extension 34.

The powertrain for the example electrified vehicle 50 includes at least a battery pack 58, a motor, a generator, and an internal combustion engine. The powertrain may utilize a first drive system that includes a combination of the engine and the generator, or a second drive system that includes at least the motor, generator, and a battery pack.

As is known, power stored in the battery pack 58 is used to power the motor, the generator, or both. The motor and generator may be separate or have the form of a combined motor generator.

The example charger 10 can communicate power to an electrified vehicle 50 from a wall source 54. The power is used to recharge battery cells within the battery pack 58. The power could be used for precharging. An operator of the electrified vehicle 50 may use the charger to couple the electrified vehicle 50 to the wall source 54 to recharge the battery pack 58 of the electrified vehicle 50 when the electrified vehicle 50 is parked within a garage, for example.

The charger 10 receives power at 110 volts from the wall source 54. Other example chargers may receive power at other voltages, such as 220 volts.

Figure 4:
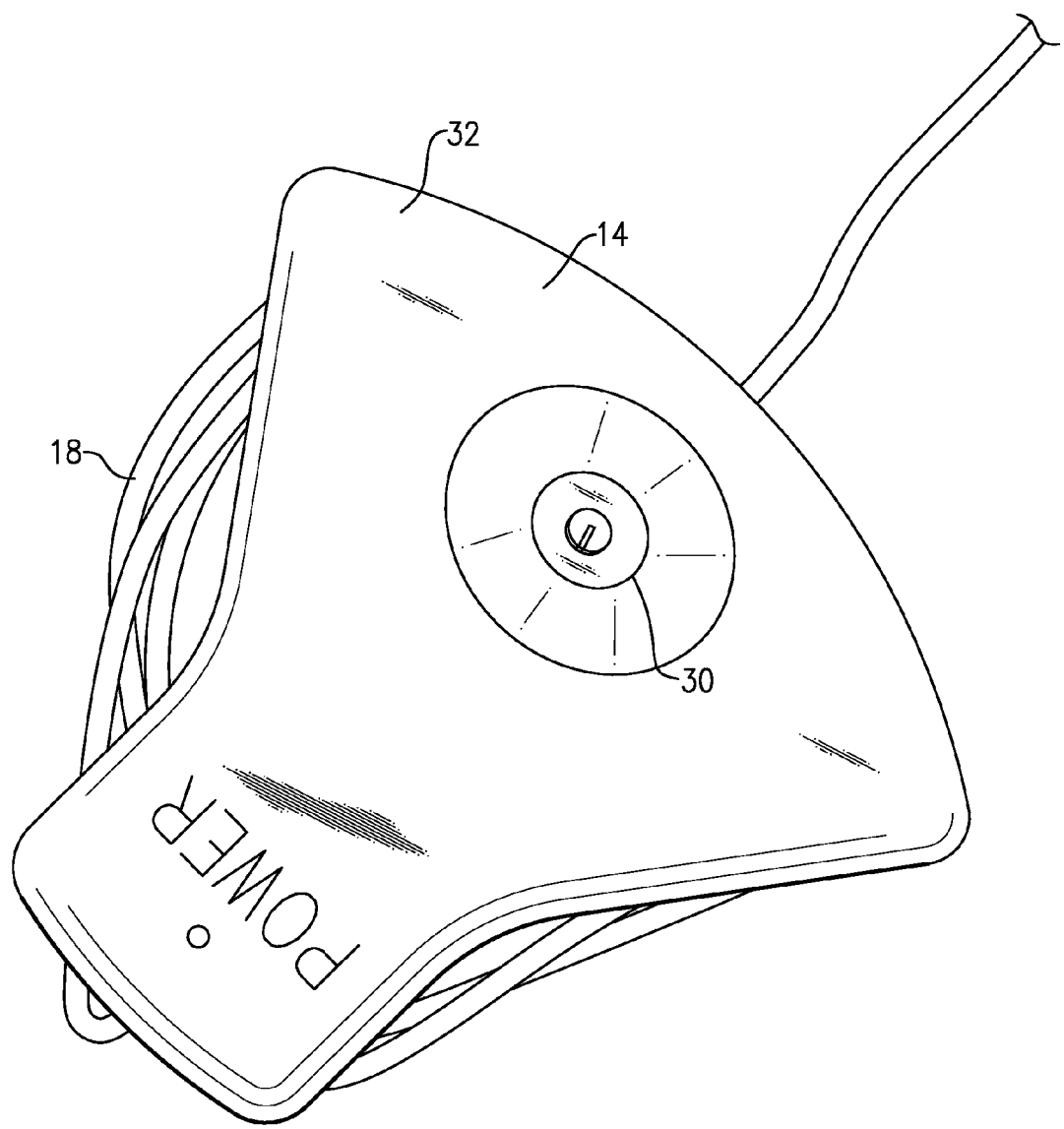
FIG. 4 shows a perspective view of portions of the lockable charger assembly of the FIG. 1.
Figure 5:
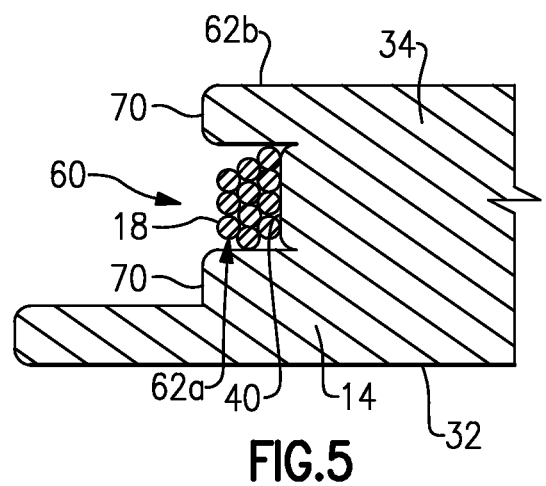
FIG. 5 shows a section view at line 5-5 in FIG. 2 with the cord fully wrapped.

The charger 10 is a portable charger. The charger 10 can be stored within a trunk compartment of the electrified vehicle 50 when not in use. When stored, the cord 18 can be coiled and wrapped around the housing 14 of the lockable charger 10 as shown in FIGS. 1, 4, and 5.

The example housing 14 defines a groove 60 to secure the cord 18 when wrapped. The groove 60 extends circumferentially about a perimeter of the extension 34. Generally, the groove 60 has walls 62a and 62b extending from a floor 40.

The groove 60 holds the cord 18 when the cord 18 is wrapped about the extension 34. The example groove 60 extends about the entire perimeter of the extension 34 and is continuous about the entire perimeter.

In the example charger 10, the lock assembly 30 is positioned along an axis A, and the cord 18, when wrapped about the extension 34, is wrapped about the axis A.

Figure 6:
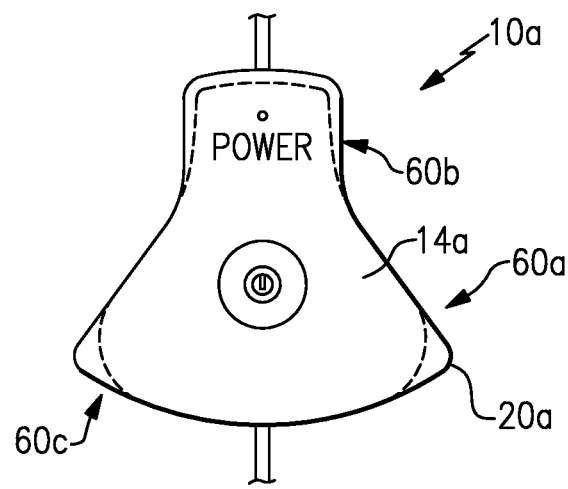
FIG. 6 shows a lockable charger housing of another example lockable charger assembly.

Referring to FIG. 6, in another example charger 10a, a groove of a housing 14a includes separate groove sections 60a, 60b, and 60c. The groove of the housing 14a is not circumferentially continuous.

Figure 7:
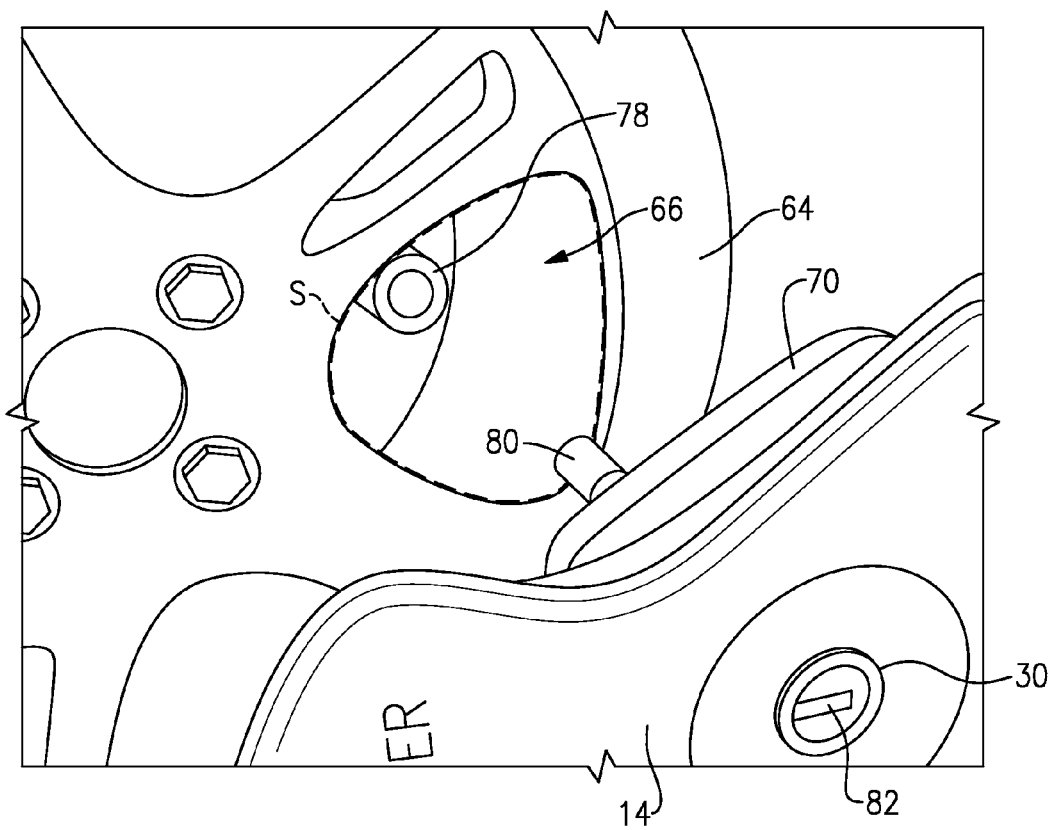
FIG. 7 shows the lockable charger assembly of claim 1 moving toward a secured position.
Figure 8:
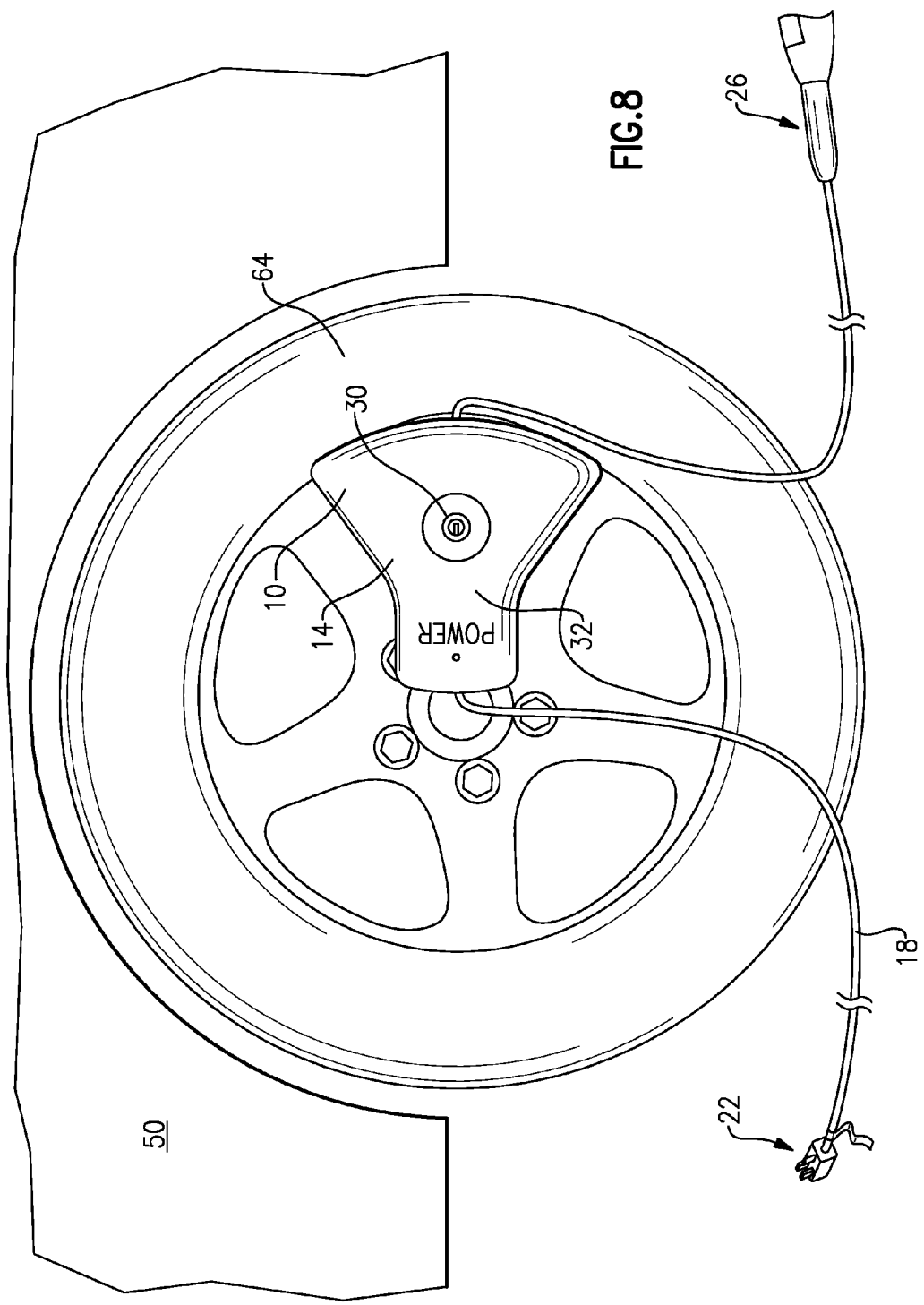
FIG. 8 shows the lockable charger assembly of claim 1 in a secured position.

Referring now to FIGS. 7 to 8 with continuing reference to FIGS. 1 to 5, the example lock assembly 30 is used to secure the charger 10 to the electrified vehicle 50 in a secured position. In this example, the lock assembly 30 secures the charger 10 to a wheel 64 of the electrified vehicle 50.

When secured, the example charger 10 is received within an open area 66 at least partially defined by a rim of the wheel 64. Securing the charger 10 to the wheel 64 prevents, among other things, the charger 10 from being stolen during a charge.

Notably, the extension 34 of the charger 10 is shaped such that the extension 34 can be received within an open area 66 that is defined by a portion P of the electrified vehicle 50.

The extension 34 has one or more surfaces 70 shaped to correspond to a shape S of a portion of the electrified vehicle 50. That is, the surfaces 70 generally track the contours of the portion.

Since the surfaces 70 have the shape that corresponds to the shape S of the portion of the electrified vehicle 50, the extension 34 of the charger 10 fits snugly within the open area 66 against the electrified vehicle 50 when the extension 34 is within the open area 66. Snugly fitting the charger 10 against the electrified vehicle 50 can help prevent the charger 10 from being detached.

The groove 60 is positioned such that, when the extension 34 is positioned within the open area 66, the groove 60 is within the open area 66. The groove 60 is shielded and hidden by portions of the wheel 64, which helps to minimize access points for dislodging the charger 10 from the wheel 64.

The example wheel 64 includes a locking receptacle 78. As the charger 10 moves from the position of FIG. 6 to the secured position of FIG. 7, a lock cylinder 80 of the lock assembly 30 is received within the locking receptacle 78 as the extension 34 is received within the open area 66.

The lock assembly 30 is configured to receive a key via a key opening 82. Actuating the key within the key opening 82, locks and unlocks the lock cylinder 80 of the lock assembly 30 from the locking receptacle 78. When the lock cylinder 80 is unlocked from the locking receptacle 78, the charger 10 can be moved relative to the wheel 64. When the lock cylinder 80 is locked to the locking receptacle 78, the charger 10 is secured relative to the wheel 64.

In another example, the locking assembly 30 includes a locking receptacle and the wheel 64 includes the lock cylinder. Still other examples can include locking assemblies that do not include a locking receptacle, a lock cylinder, or both.

In another example, a charger can be secured another area of the electrified vehicle 50. For example, in another example, the charger could be locked to a side minor of the electrified vehicle 50. In such examples, the charger includes surfaces shaped to correspond to the shape of the side mirror, surrounding areas of the side minor, or both.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

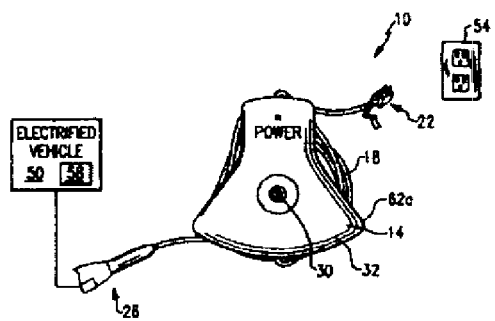
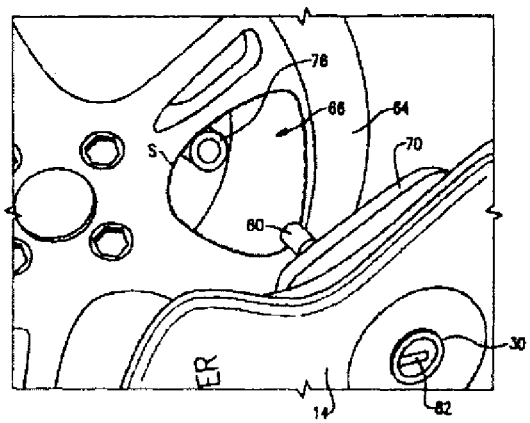

We claim:

1. An assembly, comprising:
    a cord; and
    a lockable charger housing having a surface shaped to correspond with a shape of a portion of an electrified vehicle and configured to be received within the portion when the lockable charger housing is in a secured position, wherein the portion of the electrified vehicle is a vehicle wheel, and wherein the lockable charger housing includes a groove to receive the cord when the cord is wrapped about the lockable charger housing, the groove configured to be hidden by the electrified vehicle when the lockable charger housing is secured to the electrified vehicle.

2. The assembly of claim 1, comprising a lock assembly positioned along an axis and configured to selectively lock the lockable charging housing to the electrified vehicle, the cord wrapped about the axis when the cord is wrapped about the lockable charger housing and received within the groove.

3. The assembly of claim 1, wherein the lockable charger housing includes a groove to selectively receive the cord, the groove opening away from the lockable charger housing.

4. The assembly of claim 3, wherein the lockable charger housing includes an extension and the groove extends circumferentially about a perimeter of the extension.

5. The assembly of claim 4, wherein the groove is continuous about the entire perimeter of the extension.

6. The assembly of claim 3, further comprising a lock assembly directly secured to the lockable charger housing, the lock assembly moveable between a locked position and an unlocked position.

7. An assembly, comprising:
a cord; and
a lockable charger housing having a surface shaped to correspond with a shape of a vehicle wheel, wherein the lockable charger housing includes a groove received within a portion of the vehicle wheel when a lock assembly is in a locked position, the groove receiving a portion of the cord when the lock assembly is in an unlocked position.

8. The electrified vehicle of claim 7, comprising the lock assembly, the lock assembly directly secured to the lockable charger housing, the lock assembly configured to directly engage a portion of the wheel when the lock assembly is in the locked position.

9. The electrified vehicle of claim 8, wherein the lock assembly comprises a locking cylinder receivable within a locking receptacle of the wheel.

10. A method, comprising:
positioning a surface of a lockable charger housing against a portion of an electrified vehicle, the surface having a shape corresponding to a shape of the portion of the electrified vehicle, the surface at least partially received within the portion of the electrified vehicle; and
securing the lockable charger housing relative to the portion after the positioning, wherein the portion is a portion of a vehicle wheel and comprising a groove in the lockable charger housing, the groove received within the portion of the vehicle wheel when the lock is in the locked position and the groove receiving a portion of a cord when the lock is in the unlocked position.

11. The method of claim 10, wherein the securing comprises actuating a lock from an unlocked position to a locked position, at least a portion of the lock secured directly to the lockable charger housing.

12. The method of claim 11, wherein the lock interfaces directly with the lockable charger housing.

13. The method of claim 12, wherein the portion is a portion of a vehicle wheel and comprising a groove in the lockable charger housing, the groove received within the portion of the vehicle wheel when the lock is in the locked position and the groove receiving a portion of a cord when the lock is in the unlocked position.

14. The method of claim 10, wherein the groove extends about a perimeter of the lockable charger housing.

15. The method of claim 10, further comprising inserting a lock cylinder within a lock receptacle during the securing.

16. The method of claim 10, wherein the portion is at least partially provided by a rim of a wheel.

* * * * *

UNITED STATES PATENT AND TRADEMARK OFFICE
CERTIFICATE OF CORRECTION

PATENT NO. : 9,463,701 B2
APPLICATION NO. : 14/514657
DATED : October 11, 2016
INVENTOR(S) : Mohannad Hakeem It is certified that error appears in the above-identified patent and that said Letters Patent is hereby corrected as shown below:

Delete the Title Page and substitute the attached Title Page therefor.

In the Claims

Delete "Claim 13".

Renumber Claim 14 as 13, 15 as 14 and 16 as 15.

Signed and Sealed this
Twenty-first Day of March, 2017

Michelle K. Lee
*Director of the United States Patent and Trademark Office*

CERTIFICATE OF CORRECTION (continued)

(12) United States Patent
Hakeem et al.

(10) Patent No.: US 9,463,701 B2
(45) Date of Patent: Oct. 11, 2016

(54) ELECTRIFIED VEHICLE CHARGER

(71) Applicant: FORD GLOBAL TECHNOLOGIES, LLC, Dearborn, MI (US)

(72) Inventors: Mohannad Hakeem, Dearborn, MI (US); Eid Farha, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 190 days.

(21) Appl. No.: 14/514,657

(22) Filed: Oct. 15, 2014

(65) Prior Publication Data
US 2016/0107529 A1  Apr. 21, 2016

(51) Int. Cl.
H01R 11/00 (2006.01)
B60L 11/18 (2006.01)

(52) U.S. Cl.
CPC .................. B60L 11/1816 (2013.01)

(58) Field of Classification Search
CPC ............ Y02T 10/7072; Y02T 90/14; B60L 11/1818; B60L 2230/12; H01R 13/639; H01R 13/6395; H01R 13/6397; H01R 13/6392
USPC ......... 439/501, 504, 535, 310, 372, 34, 133, 439/144; 191/12.4, 12 R; 320/109, 111, 104
See application file for complete search history.

(56) References Cited

U.S. PATENT DOCUMENTS

| | | | | |
|---|---|---|---|---|
| 4,904,205 A | * | 2/1990 | Rice | H01R 13/72 191/12.4 |
| 5,720,627 A | * | 2/1998 | Gillbrand | H02G 11/02 191/12 R |
| 5,831,245 A | * | 11/1998 | Debourg | A45D 26/0014 219/227 |
| 5,855,262 A | * | 1/1999 | Jackson | B60L 11/1816 191/12.4 |
| 8,550,833 B2 | | 10/2013 | Martin | |
| 2011/0139521 A1 | * | 6/2011 | Ichikawa | B60L 11/123 180/65.1 |
| 2011/0149455 A1 | * | 6/2011 | Ueno | B60L 3/0069 361/87 |
| 2011/0234159 A1 | * | 9/2011 | Ohtomo | B60L 11/1816 320/109 |
| 2012/0228420 A1 | * | 9/2012 | Ichikawa | B60K 6/445 242/398 |
| 2013/0249282 A1 | * | 9/2013 | Ishii | H02J 7/0055 307/10.1 |

OTHER PUBLICATIONS

Master Locks, Motorcycle Locks Webpage. Accessed at: www.masterlock.com/products/product_details/8156DPS.
GM Volt Owners Forum. Accessed at: http://gm-volt.com/forum/showthread.php?7958-Portable-110V-cord-anti-theft-device/page4&s=ecec0350e6b5faa67c2cbf08f24f3637.
AL-KO Secure Wheel lock website. Accessed at: http://secure.al-ko.co.uk.

* cited by examiner

Primary Examiner — Abdullah Riyami
Assistant Examiner — Harshad Patel
(74) Attorney, Agent, or Firm — Carlson, Gaskey & Olds, P.C.

(57) ABSTRACT

An exemplary assembly includes a cord and a lockable charger housing, which has a surface that is shaped to correspond with a shape of a portion of an electrified vehicle. An exemplary method includes positioning a surface of a lockable charger housing against a portion of an electrified vehicle. The surface has a shape corresponding to a shape of a portion of the electrified vehicle. The method includes securing the lockable charger housing relative to the portion after the positioning.

15 Claims, 6 Drawing Sheets